(12) United States Patent
Kachynski et al.

(10) Patent No.: US 7,413,341 B1
(45) Date of Patent: Aug. 19, 2008

(54) IMAGING METHODS

(75) Inventors: Aliaksandr Kachynski, Amherst, NY (US); Andrey Kuzmin, Snyder, NY (US); Haridas Pudavar, North Tonawanda, NY (US); Paras N. Prasad, Williamsville, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 143 days.

(21) Appl. No.: 11/204,605

(22) Filed: Aug. 16, 2005

Related U.S. Application Data

(60) Provisional application No. 60/601,949, filed on Aug. 16, 2004.

(51) Int. Cl.
*G01K 11/00* (2006.01)
(52) U.S. Cl. ..................................................... 374/161
(58) Field of Classification Search ................. 374/161
See application file for complete search history.

(56) References Cited

U.S. PATENT DOCUMENTS

| | | | | |
|---|---|---|---|---|
| 4,729,668 A | * | 3/1988 | Angel et al. | 374/161 |
| 4,767,219 A | * | 8/1988 | Bibby | 374/123 |
| 5,705,821 A | * | 1/1998 | Barton et al. | 250/458.1 |
| 6,840,669 B2 | * | 1/2005 | Kleinerman | 374/120 |
| 7,008,559 B2 | * | 3/2006 | Chen | 252/301.6 S |
| 2003/0128737 A1 | * | 7/2003 | McGrath et al. | 374/161 |
| 2005/0185188 A1 | * | 8/2005 | McGrew | 356/450 |

OTHER PUBLICATIONS

Holzwarth et al.; Laser Temperature Jump Experiments With Nanometer Space Resolution Using Rhodamine 101 Anti-Stokes Fluorescence From Nanoseconds to Milliseconds for Precise Measurements of Temperature Changes in Liquid Microenvironments; Abstracts of Papers, 225th ACS National Meeting, New Orleans, LA, United States, Mar. 23-27, 2003 COLL-157.

Migler et al.; Fluorescence Based Measurement of Temperature Profiles During Polymer Processing; Polymer Engineering and Science, Jan. 1998, vol. 38, No. 1.

Roy et al.; Ceramic-Based Nanoparticles Entrapping Water-Insoluble Photosensitizing Anticancer Drugs: A Novel Drug-Carrier System for Photodynamic Therapy; J. Am. Chem. Soc. 2003, 125, 7860-7865.

Bur et al.; Fluorescence Based Temperature Measurements and Applications to Real-Time Polymer Processing; Polymer Engineering and Science, Aug. 2001, vol. 41, No. 8.

* cited by examiner

*Primary Examiner*—Gail Verbitsky
*Assistant Examiner*—Megann E Vaughn
(74) *Attorney, Agent, or Firm*—Hodgson Russ LLP

(57) ABSTRACT

A method of local temperature measurement in a sample is provided. The method comprises the stimulation, at a location in the sample, of anti-Stokes and Stokes emission from fluorophores which are present at the location in the sample, measuring the intensities of the stimulated radiation and calculating the temperature at the location from the measured intensities. The method can be used to obtain a thermal image of the sample.

20 Claims, 8 Drawing Sheets
(3 of 8 Drawing Sheet(s) Filed in Color)

US 7,413,341 B1

IMAGING METHODS

This application claims priority to U.S. provisional application No. 60/601,949, filed on Aug. 16, 2004, the disclosure of which is hereby incorporated by reference.

FIELD OF THE INVENTION

The present invention pertains to thermal imaging and more generally to the location-specific measurement of temperature in a sample.

BACKGROUND OF THE INVENTION

Thermal mapping gives information about thermal loading within a body. Examples are heat distribution inside a microchip, and the location of energetically active structures of a living organism, such as a cell. Heretofore, thermal mapping or imaging has been realized for macro-objects using thermovision cameras, i.e., devices which convert thermal emission into visible radiation. However, the thermal emission wavelength utilized by these cameras is around 7-13 μm, and thus the technology cannot be applied to the study of micro-objects, which have sizes that are close to the wavelength of thermal emission. For such applications, other technology is required.

Current imaging methods, including thermal imaging, are limited by their ability to resolve dynamic processes which occur on time scales faster than approximately 0.1 seconds. Laser scanning microscopy is extensively used in bio-imaging due to the high resolution provided by this technique. In many applications, imaging is done with, for example, two different laser excitations to calculate the ratio of two chromophore populations in living cells. Typically this is achieved by switching the laser beam after each frame of data acquisition using raster scanning of the laser beam. However, in the case of fast dynamical processes under investigation, such a strategy is often insufficient, as by the time the second laser begins to acquire an image (typically 100s of milliseconds) the dynamical picture has changed, giving erroneous signals.

SUMMARY OF THE INVENTION

The present invention provides a method for the determination of temperature at one or more locations in a sample. The method comprises the use of a sample having a fluorophore, such as, for example, a fluorescent dye, fluorescent nanoparticle, or fluorescent protein, present at a location to be thermally measured. The fluorophore is characterized by having an optical absorption band which, when stimulated, results in the emission of a spectrum of fluorescence radiation, i.e., "Stokes radiation" or "Stokes emission." Stimulation of fluorescence emitters at the long wavelength (low energy) edge of this Stokes emission band gives rise to anti-Stokes Emission (ASE). The intensity of anti-Stokes radiation is temperature dependent. Temperature at a sample position can be derived by sequentially measuring the intensity of anti-Stokes emission and Stokes emission at a sample position, in either order, and using the Boltzmann distribution to derive temperature, or if fluorophore concentration at the position is known, comparing the measured ASE intensity to an ASE/temperature plot for the dye. While it is convenient to measure the integrated intensity of the Stokes emission or ASE, the intensity of either or both bands can instead be measured at a single wavelength, such as with filters or a monochromator.

In one embodiment, a method for the thermal imaging of a sample is provided. In such a case, the dye is distributed across or throughout an area or volume to be imaged. Micrometer-resolution thermal imaging can be accomplished by using the position-dependent Stokes radiation to normalize over sample position with respect to variations in dye concentration. In another embodiment, fast dynamic processes can be thermally imaged by fast switching of excitation lasers using acousto-optic modulators during alternate line raster scanning.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Curve 1—Rh 640 incorporated in nanoparticles (water solution); excitation—He—Ne laser ($\lambda$=633 nm).

Curve 2—IR 140 (DMSO solution); excitation—Nd:YAG laser ($\lambda$=1064 nm).

Figure 5:
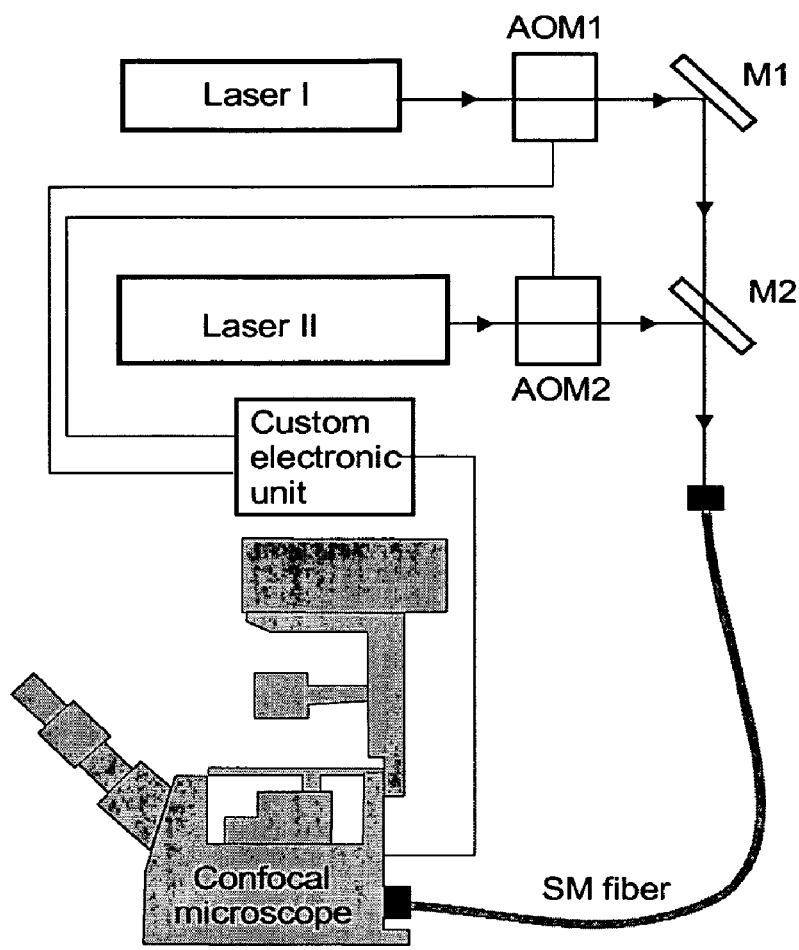

FIG. 5—Schematic diagram showing an optical setup used for imaging.

Figure 6:
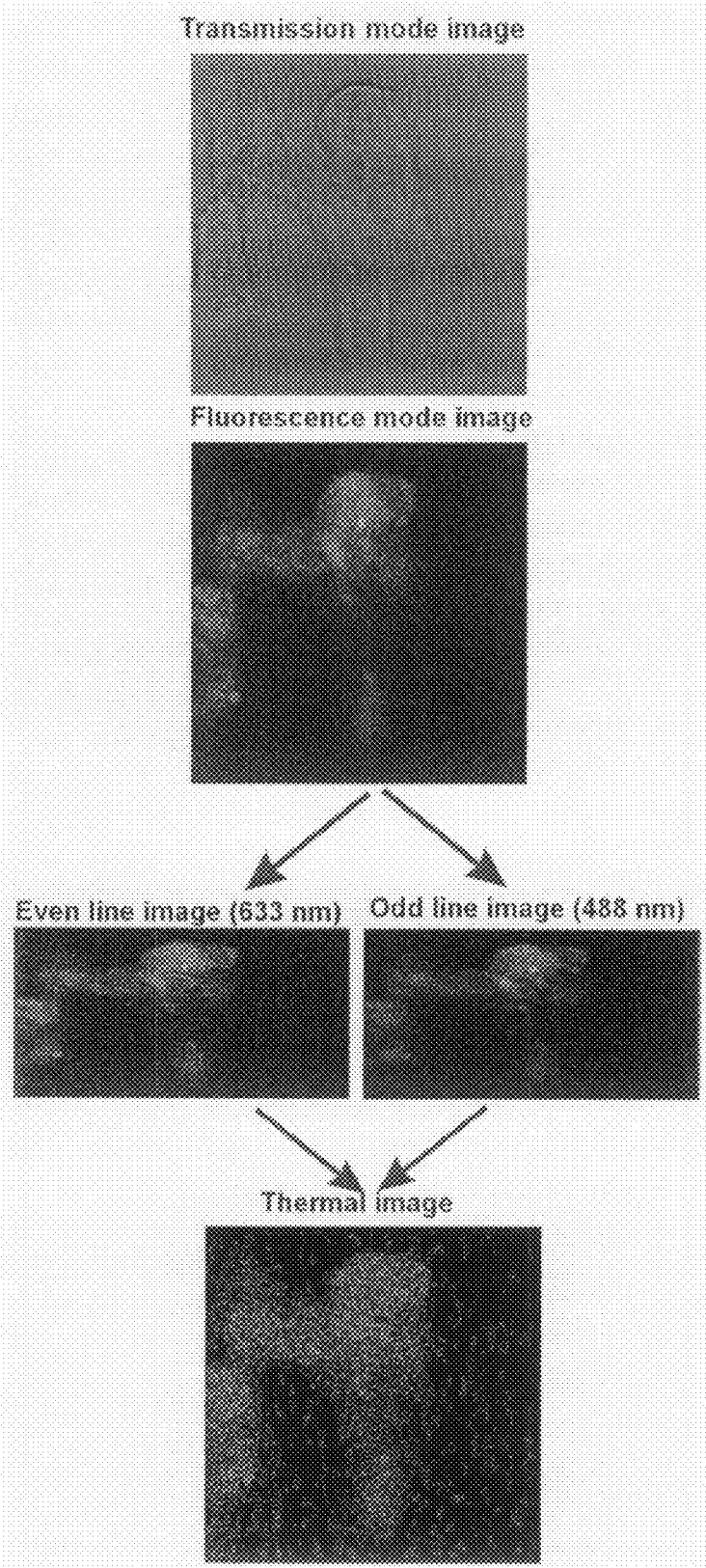

FIG. 6—Thermal images of a live cell obtained using confocal microscope (BioRad MRC-1024) and Rhodamine 640 with 488 nm laser line from an Ar ion laser and 633 nm line from a He—Ne laser as excitation sources, showing the process of obtaining normalized thermal images from Stokes and anti-Stokes images.

Figure 7:
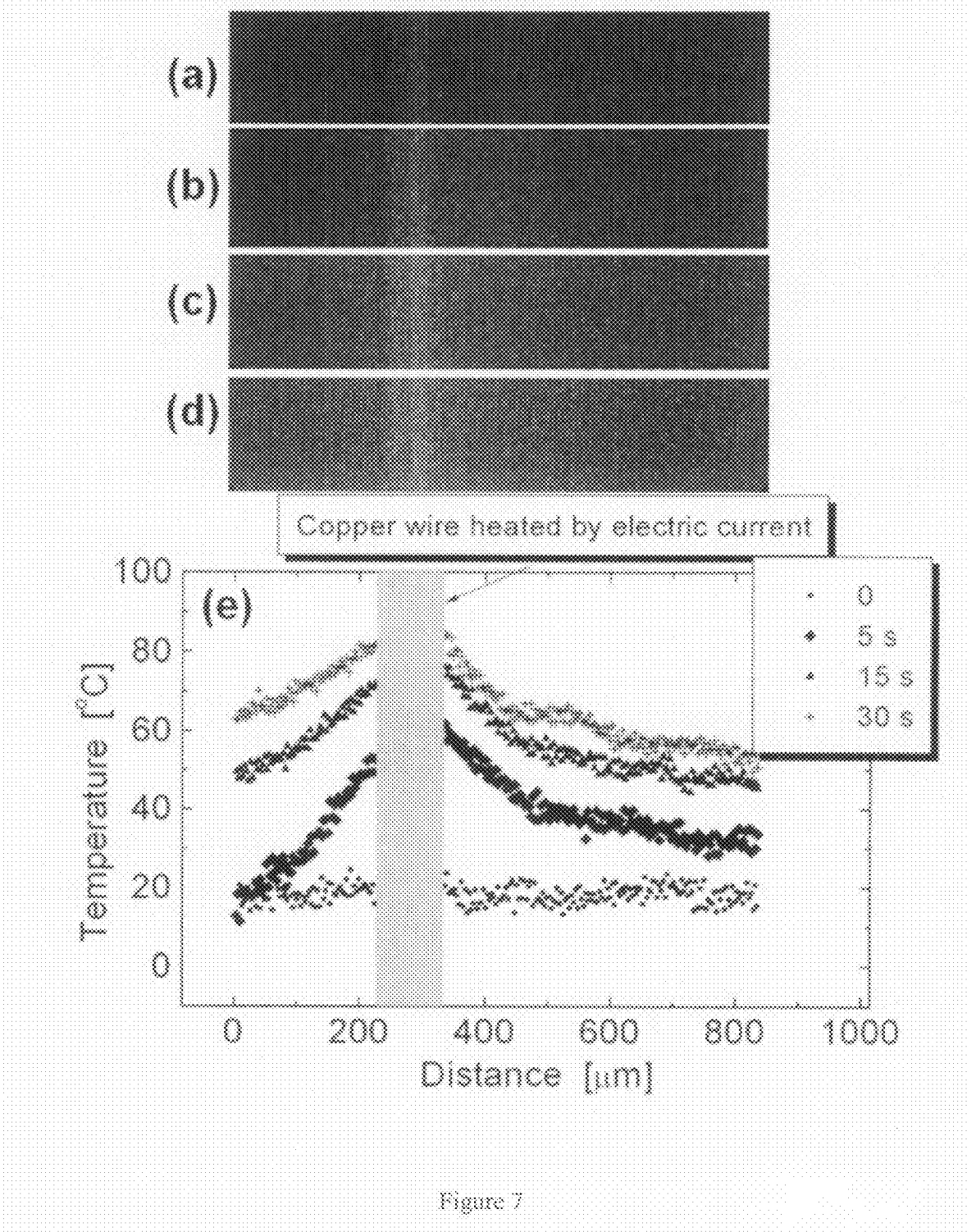

FIG. 7—Ratio imaging of a metallic wire heating element in a dye-containing polymer film. Excitations at 488 nm and 633 nm. Rhodamine 640 incorporated in film ~120 μm of thickness.

(a)-(d) Thermal images of the sample, when it is heated by electric current ~2 A passing trough the copper wire for different time of the heating process after switching of the current: 0 s (a), 5 s (b), 15 s (c) and 30 s (d) (b).

(e) Averaged horizontal profiles extracted from the center of thermal images obtained before switching of the current (0 s) and after 5, 15 and 30 seconds.

FIG. 8—

(a) Thermal images of KB cells stained with Rhodamine-640. A part of the imaging area was locally heated with a 1.9 μm laser beam delivered by a fiber delivery system. The color-coded images obtained as a time series shows the heating and cooling cycle when heating laser is turned on and off.

(b) Shows the transmission image of the cells. The shadow on the left top corner is due to the optical fiber, used for deliver 1.9 μm laser emission to heat the cells locally.

(c) Measured during localized heating and cooling cycles induced by external heating laser.

(d) Lateral temperature profile of an individual cell.

Figure 9:
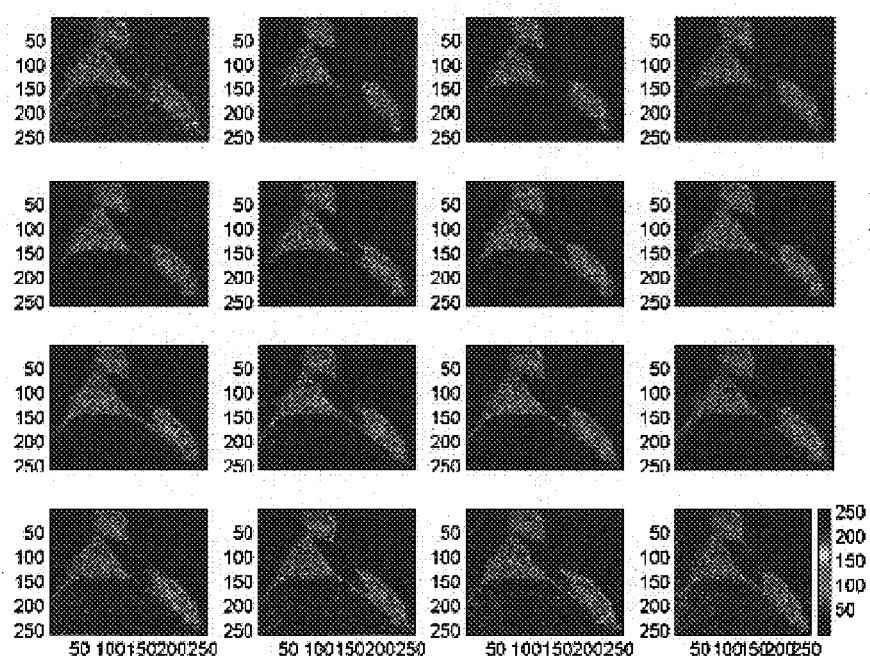

FIG. 9—A time series of thermal mapping of cell images obtained using ASE and ratio imaging. Experimental conditions and the dye used are the same as used in the other examples. The pseudo color map shows the temperature gradient inside cell.

DETAILED DESCRIPTION OF THE INVENTION

The present invention involves the use of anti Stokes Emission (ASE) and Stokes emission in the temperature measurement and thermal imaging of samples. Because the wavelength of anti-Stokes and Stokes radiation is generally on the order of a micrometer, the method is capable of micrometer resolution or better.

ASE is characteristic of many organic dyes, quantum dots, fluorescent proteins and other chemical entities. The term "fluorophore," as used hereafter, refers to organic or inorganic emitters of anti-Stokes radiation, regardless of whether the emitter is a chemical dye substance, a quantum dot, a fluorescent protein or other ASE-producing entity.

In the inorganic chemistry arts, the term "photoluminescence" is often used to refer to fluorescence emission, as well as other types of emission, such as phosphorescence, from inorganic nanoparticles such as quantum dots. Herein, the term "fluorescence" is used to describe fluorescence emission from such particles.

The fluorophore is incorporated into or on a sample to be imaged. The incorporation gives a distribution of fluorophore throughout an area or volume to be mapped. The fluorophore can be incorporated by many methods which are known in the art. For example, it can be incorporated via the direct uptake of the fluorophore or fluorophore-laden nanoparticles into a living cell.

There are many methods of incorporation of dyes into samples. One way is the use of nanoparticles. Typically, the size of nanoparticles used in biological imaging applications is less than 100 nm diameter. However, for non-biological or inorganic applications, such as measurement of heat distribution across a semiconductor chip, particle size can be larger, even up to approximately 250 nm in some cases. If nanoparticles are used, a particle diameter which is less than the optical resolution of the imaging system is required for high spatial resolution. Optical resolution is on the order of the wavelengths of light which are used to stimulate Stokes and anti-Stokes radiation. It is within the knowledge of one skilled in the art to determine the optical resolution of the imaging system used.

Many techniques for the preparation of fluorescent nanoparticles are known in the art. The nanoparticles may encapsulate or bear fluorescent dyes, or be fluorescent themselves. Non-limiting examples of nanoparticles are dye incorporated polymeric nanoparticles; dye encapsulated silica nanoparticles, optionally organically modified; fluorescent quantum dots; liposomic particles which contain organic dyes; and various inorganic nanocrystals such as, for example, rare earth doped nanocrystals. The advantage of using nanocrystals or nanoparticles is that many of them can be surface modified to target living organelles, specific cell types or specific organs in the body. Areas of interest in a biological sample can thus be preferentially imaged, with resolution at desired sites enhanced by the high numbers of nanoparticles present. Examples of the preparation of fluorophores which are encapsulated in or otherwise associated with nanoparticles and liposomes can be found in Roy et al, Journal of the American Chemical Society 2003, 125, 7860-7865; Roy et al, *Proceedings of the National Academy of Sciences of the United States of America* 2005, 102, 279-284; Schott et al, *Biochimica Et Biophysica Acta* 1992, 1110, 151-157 and Oh, et al, *Pharmaceutical Research* 1997, 14, 1203-1209.

Fluorophores which can be used in the present invention include dyes which are capable of Stokes and anti-Stokes emission. Non-limiting, commonly available examples of such dyes are Rhodamine 640, Rhodamine B, Rhodamine 6G, IR-140, fluorescin as well as the Alexa-Fluor® series of molecular probe dyes. Other dyes which can be used are organometallic complex fluorophores such as lanthanide chelates. One example of such fluorophore is $[Ru(bpy)_2(dppz)]^{2+}$ (where bpy is 2,2'-bipyridine and dppz is dipyrido[3,2-a:2', 3'-c] phenazine).

Other non-limiting example of suitable fluorophores are quantum dots, as mentioned above in the discussion of nanoparticles. Non-limiting examples include those comprised of CdSe, CdSe/ZnS, InP, InP/ZnS, PbS, and PbSe. Commercially available quantum dots are available in sizes which have emission in a range which includes the visible and near-IR.

Rare-earth doped inorganic nanocrystals can also be used as fluorophores. Non-limiting examples include Erbium and Europium doped nanoparticles.

Fluorescent proteins can also be used as fluorophores. Non-limiting examples include, CFP, GFP, YFP, etc. Many fluorescent proteins can be expressed in living cells by introducing the corresponding DNA vector into the cells. There are commercially available plasmid DNA vectors available for specific protein conjugates of these fluorescent proteins.

In general, most emitters of Stokes fluorescence can be used as fluorophores for thermal imaging if excitation sources, such as, for example, laser lines, are available which match the Stokes and anti-Stokes excitation wavelengths characteristic of the emitter. It should be noted that fluorophores may differ in temperature sensitivity, and thus a fluorophore should be chosen which gives measurable fluorescence under the excitation intensities and detection sensitivities of the imaging system.

Yet another example of how fluorophores can be distributed for imaging is their incorporation into a polymer sheet which is in contact with a sample. This method is particularly appropriate for measuring a temperature distribution on a surface. An example is the measurement of hot spots in a semiconductor during fabrication or function. As a non-limiting example, a polymer such as Poly-methyl methacrylate (PMMA) and dye Rodamine 640 can be dissolved in acetone and spin coated or dip-coated on the surface of a microchip. Thermal loading in these chips can thus be measured with submicrometer resolution. A dye-containing polymer can also be fabricated as a sheet prior to its contact with the sample.

Alternatively, if the sample inherently contains fluorescent material capable of Stokes and anti-Stokes radiation, the incorporation of a fluorophore may not be necessary. Examples of such a material type include autofluorescent biological materials such as NADH, Flavins etc., expressed in many living cells.

Figure 4:
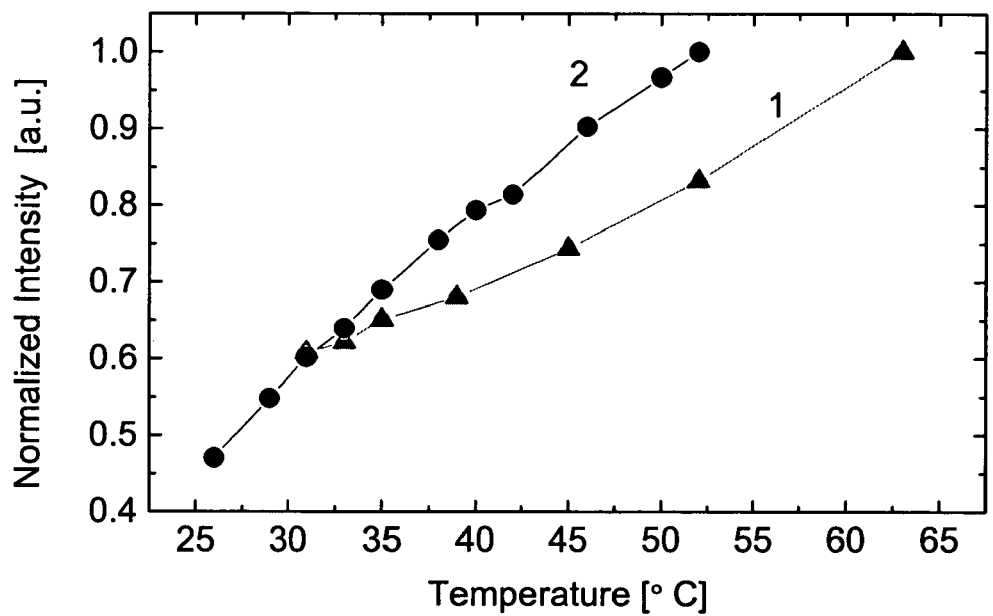
FIG. 4—Temperature dependence of anti-Stokes emission of RH 640 and IR 140. Temperature dependence of anti-Stokes fluorescence.

The selection of a fluorophore can be dictated by practical concerns. As shown in FIG. 4, fluorophores can differ significantly in the sensitivity of their ASE to temperature. For example, in situations in which the stimulating radiation must be used at relatively low intensities, it may be appropriate to employ a highly temperature-sensitive fluorophore, A non-limiting example of such a fluorophore is the dye IR-140.

One concern in the selection of a fluorophore is temperature quenching. For example, at high temperature, fluorescent molecules such as some dyes can be structurally altered or inactivated. Fluorescent molecules vary in their ability to withstand high temperatures, but inorganic fluorophores such as quantum dots or rare earth doped nanocrystals are generally more suitable for high temperature applications, such as for example, inorganic applications related to semiconductors and integrated circuits. Another concern when selecting a fluorophore is photobleaching, or the destruction or inactivation of the fluorophore with photon absorption. Typically, while IR emitting dyes often show higher temperature sensitivity, they also often have higher susceptibility to photobleaching. By decreasing the excitation light intensity, photobleaching can be minimized.

In the case of samples which comprise biological materials, the choice of a fluorophore which has Stokes and/or anti-Stokes excitation wavelengths in the near-IR (approximately 750 nm to 1100 nm) can eliminate or minimize light induced effect on cell viability.

Furthermore, a fluorophore can be chosen such that its range of absorption wavelengths giving Stokes' and anti-Stokes emissions match wavelengths which can be easily generated by available irradiating equipment. Examples are laser lines from available lasers. The long wavelength edge of the Stokes emission spectrum generally comprises excitation wavelengths which will successfully stimulate ASE. By "long wavelength edge" it is meant the wavelengths which are on the low energy side of the peak absorption of the Stokes emission spectrum. The anti-Stokes excitation wavelength should be selected from this long wavelength edge. It is preferable to choose an anti-Stokes excitation wavelength which is between the wavelengths at which the Stokes emission spectrum has an intensity of one fifth and four fifths its peak value.

The object is then imaged with a laser scanning microscope using sequential scanning of two laser excitation wavelengths. A first excitation wavelength is selected such that it falls within the absorption band of the dye in use (for Stokes excitation), while the second excitation wavelength is selected such that it falls within the long wavelength edge of the Stokes emission spectrum. These wavelengths are generally in the range of from 350 to 1200 nm. In the case of imaging biological materials, the use excitation radiation of wavelengths in the range of from 700 to 1100 nm will generally give greater sample penetration than other wavelengths.

The luminescence intensity distribution under the second wavelength excitation (ASE) as a function of position on or in the sample, and it is related to temperature distribution throughout the sample via the Boltzmann distribution. The luminescence intensity distribution under Stokes excitation as a function of position on or in the sample is related to spatial variation of dye concentration. The ratio of the intensity of the ASE to the intensity of the Stokes luminescence is calculated at every location (by processing with software, for example), giving a third image, normalized with respect to spatial variances in fluorophore concentration, which is proportional to a temperature distribution corresponding to the sample. The temperature distribution can be two or three dimensional, depending on whether a sample volume or sample area is being imaged.

The term "location" within a sample generally refers to an area or volume with the dimensions of the size of the spot in which the stimulating radiation is trained upon the sample. An advantage of the present imaging method is the small spot size which can be achieved relative to other imaging methods due to the use of radiation in the visible range. Spot sizes as small as 0.3 to 1 μm can be obtained, with smaller spot sizes corresponding to shorter wavelengths. In two dimensions, the fluorescence from an area having the size of the spot is measured, and thus defines a "location." In three dimensions, the Stokes and anti-Stokes radiation is measured from a volume of sample. The volume from which fluorescence is measured, and thus the "location," has the size dimensions of the focused laser spot.

An application which compliments the idea of measurement of two different types of luminescence from molecules in order to thermally image a sample is the use of acousto-optic modulator based shutters to enable rapid sequential or alternating exposure of the sample to the two different wavelengths of light in the for of two laser lines. Such an arrangement can be generalized to measure concentrations of different molecules (such as the populations of different chromophores as mentioned in the "Background" section), or even two different excited states of the same molecule. These and other molecular differences can form the basis for a range of imaging techniques. Thus, in another embodiment, the invention generally includes the use of two acousto-optically modulated laser beams, which, if desired, may be two lines from the same laser, as a means for performing imaging of a range of types.

For thermal imaging, the use of "alternate line scanning," optionally using optical shutters such as shutters triggered via acousto-optical modulators, is particularly convenient and gives temperature measurements having greater accuracy with time than other methods of scanning due to the reduced time interval between excitations with different wavelengths.

The following description gives a non-limiting example of such an alternate line scanning system. Light from two laser emission lines from the same multi-wavelength laser are passed through two individual acousto-optic modulator-based shutters or other blocking or redirecting device and are combined using a beam splitting device such as, for example, a 50/50, dichroic mirror or polarizing beam splitter. The collinear beams are coupled into a laser scanning microscope by methods known in the art, such as, for example, via a single mode fiber or direct free space coupling. The modulators/shutters can be controlled by line synchronization signals, such as those available from a galvano scan controller of a laser scanning or microscopes, such as a confocal microscopes. For alternate lines, the beams from laser 1 and laser 2 are blocked or redirected in an alternating manner by the modulators/shutters so that the raster scanned image contains alternate lines of the image with different excitation wavelengths. The timing is particularly convenient if the lines are from the same laser.

The image is acquired at a resolution mode such that the spacing between two lines in the raster scanned image is less than the optical resolution. As is well understood in the art, optical resolution is on the order of the wavelengths of light contacting the sample and is generally the same as the spatial resolution. Scanning such that the spacing between two lines in the raster scanned image is less than the optical resolution generally ensures that each line is looking at virtually the same location of the sample. It is within the ability of one skilled in the art to determine the spatial resolution of the system.

Once the image is acquired, software is used to split the image into two images, one of each of the excitation wavelengths. This allows nearly simultaneous acquisition of two images with two different laser excitation wavelengths, with little compromise with respect to spatial resolution. Temporal separation between laser exposures at different wavelengths at a given position in the sample is reduced due to the fact that only a line of measurements is taken, rather than an entire image. Time between measurements at different wavelengths can be as small as 500 µs with existing technology.

An advantage of the method of the present invention is that the time delay between the two images obtained for ratio imaging is reduced. This increases the accuracy of the ratio images obtained, especially in case of dynamic processes. This is critical in case of bioimaging, where some processes inside live cells can occur on time scales which are too fast to be captured by methods which take an entire image in one wavelength before beginning to scan in another wavelength.

Figure 1:
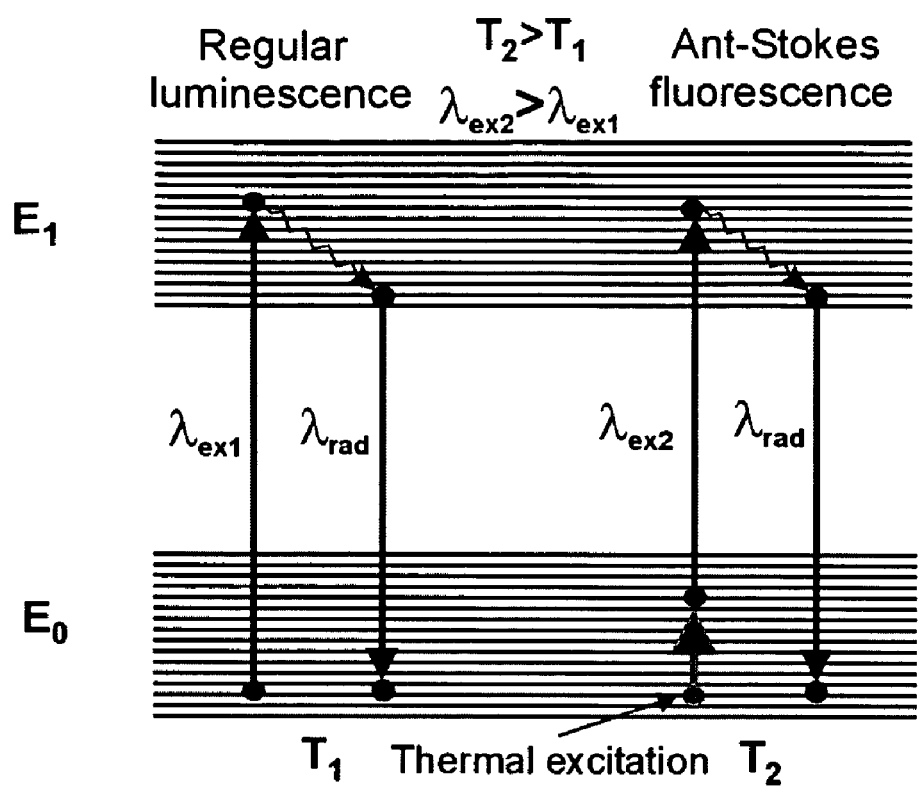
FIG. 1—Schematic demonstrating the theoretical basis of Stokes and anti-Stokes radiation. Regular and anti-Stokes luminescence in the Dye: $E_{0,v}$ and $E_{1,v'}$ are fluorophore energy levels of ground and first excited electron levels with v and v' vibration structure, $\lambda_{ex}$ and $\lambda_{rad}$ are wavelength of excitation and emission, correspondingly. For temperature $T_2 > T_1$ the upper vibration sublevels of $E_{0,v}$ level will be thermally populated. Therefore, the fluorophore can be excited by light with shorter wavelength.

Stokes and anti-Stokes emissions can be understood using the scheme shown in FIG. 1. The energy states of a hypothetical dye molecule are depicted as separated ground $E_{0,v}$ and first excited $E_{1,v'}$ electron levels with vibration sublevel structure v and v'. The number of molecules having a given energy obeys Boltzmann statistics. The higher the temperature, the greater the proportion of molecules occupying the excited energy levels.

Of most relevance to anti-Stokes emission are the vibrationally excited states of the electronic ground state. Excitation can occur from the ground vibrational state of the ground electronic state, as well from the statistically possible higher vibrational energy sublevels v of the ground electronic state. The radiative emission from electronically excited molecules yields luminescence. In case of Stokes luminescence, the preceding process of absorption occurs from ground vibrational sublevels and therefore luminescence intensity is largely independent of temperature This emission, also known as Stokes emission, is red shifted in wavelength with respect to the exciting wavelength. The absorption giving rise to ASE occurs from excited vibrational sublevels, whose population depends on temperature according the Boltzmann law (for temperature $T_2 > T_1$ thermal excitation in FIG. 1 is shown by gray arrow). Thus, the intensity of ASE is a function of temperature, with higher temperatures generally giving an increase in ASE. As the temperature is increased, upper energy levels are populated in accordance with Boltzmann law, with a corresponding increase in absorption and resulting luminescence. The ASE is generally at lower energies than the ASE-stimulating absorption.

Figure 2:
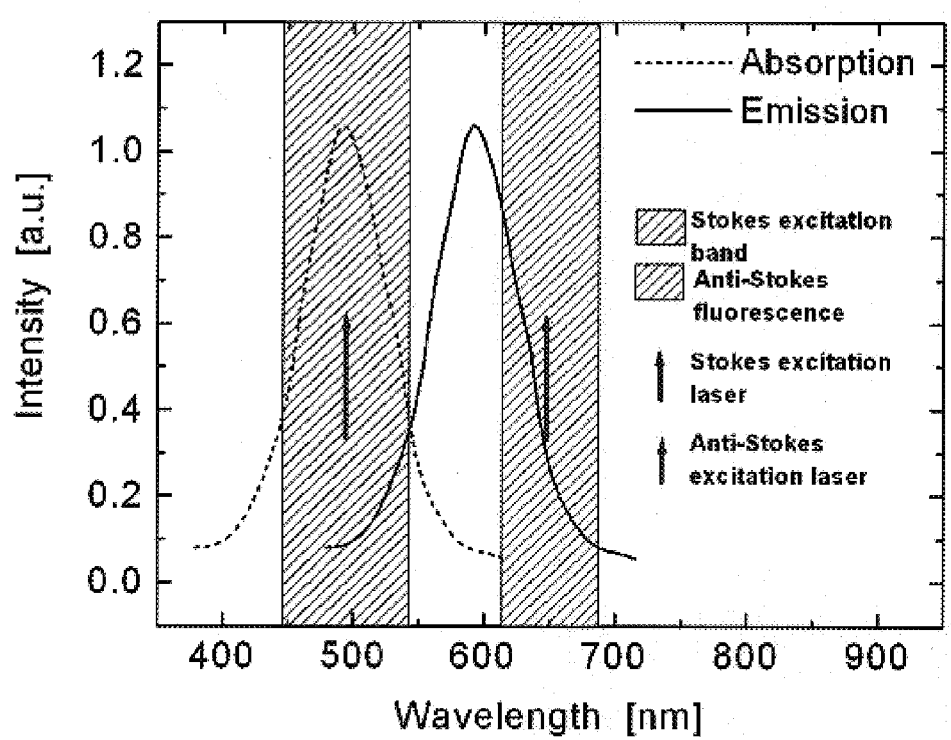
FIG. 2—Absorption and emission spectra of a typical fluorophore, showing Stokes and anti-Stokes excitation bands.
Figure 3:
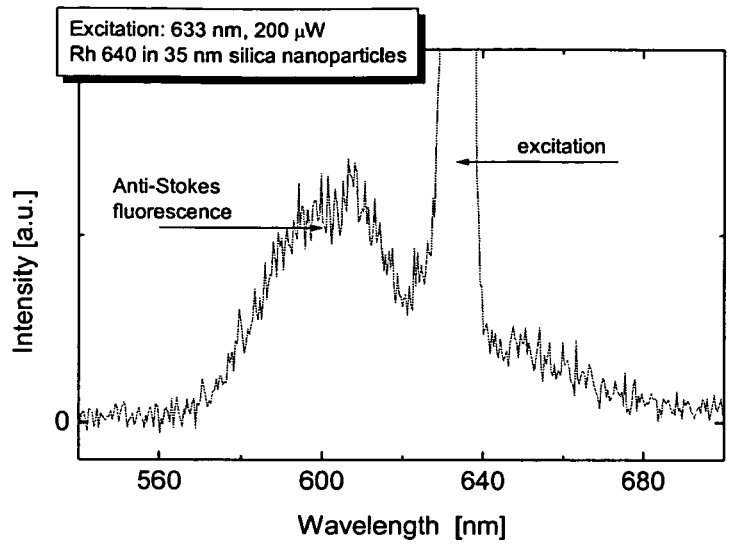
FIG. 3—Anti-Stokes fluorescence spectrum of a water solution of Rh 640 incorporated in 35 nm silica nanoparticles.

FIG. 2 shows an absorption and emission spectra of a typical dye. Here the emission spectrum represents the energy difference between the ground state and the excited level from which the molecules emit. The wavelength for Stokes excitation can be chosen anywhere in the absorption band, while the anti-Stokes excitation wavelength is preferably chosen from the wavelengths which comprise the long-wavelength edge of the Stokes emission. For example, the dye Rhodamine-640, a well known laser dye can be Stokes excited at 488 nm using an Argon laser. At the same time this dye can also be excited using a He—Ne laser at 633 nm to give ASE. FIG. 3 presents the ASE spectrum in the sample with 35 nm silica nanoparticles containing Rhodamine 640 (Rh640) and dispersed in water. He—Ne laser (633 nm) was used as the excitation source. The temperature dependence of anti-Stokes emission intensity measured for the same sample is shown in FIG. 4, curve 1.

By choosing the combination of the fluorophore and the excitation wavelength it is possible to obtain high ASE sensitivity to temperature. For example, the dye IR 140 when stimulated by 1064 nm radiation (curve 2 in FIG. 4) demonstrates approximately twice the temperature sensitivity of Rh 640 stimulated by 633 nm radiation.

The temperature resolution of the thermal images generated by the methods described herein is generally improved with increasing difference in wavelength between the peak anti-Stokes emission and the anti-Stokes excitation wavelength. However, the intensity of anti-Stokes radiation generally decreases with this difference, having the opposite effect on temperature resolution. It is within the ability of one skilled in the art to vary the difference and thus improve the temperature resolution of generated images.

Temperature mappings can be derived from the Stokes and anti-Stokes emission measurements. Generally, a plot of temperature vs. fluorescence intensity is empirically determined for the fluorophore (see FIG. 4 for examples), and the temperature of each location in a sample is determined by comparison to the plot. It is within the ability of one skilled in the art to normalize with respect to variables such as the intensities of both wavelengths of excitation radiation. Alternatively, if the energy level structure of the dye is known, a plot of temperature vs. fluorescence intensity can be theoretically derived. Both of the preceding methods can be used regardless of whether integrated intensity or intensity at an ASE fluorescence wavelength is measured.

Alternative line scan using ASE is useful for the hot spot testing in the semiconductor fabrication industry, as well as the monitoring of localized temperature gradients inside polymer blocks during in-situ polymer processing. The biological uses are expected to be significant. For example, temperature mapping using ASE as well as the alternate line scan embodiment will be useful in:

1) investigation of temperature profile of organelles or compartments of live cell cultures using organelle specific or other site specific fluorophores;

2) temperature mapping of the specific sites of biological objects using dye-containing nanoparticles which are site specific; and 3) mapping of localized temperature changes in cells or tissues, induced by physiological changes, by drugs, laser therapy or other external agents and diseases.

Thermal imaging permits thermal mapping of the objects with micrometer resolution (comparable to the wavelength used for imaging. For example, for Rhodamine 640, resolution is around 0.6 micrometer). It permits flexibility in adjusting the thermal sensitivity by choosing of dye and excitation wavelength. It permits flexibility of choosing different excitation source and dye combination based on the sample properties. It allows high resolution confocal thermal mapping of temperature variation inside live cell cultures or tissues. Nanoparticle emitters with surface capping and carrier groups can be used to obtain temperature distribution and heat dissipation images at selected sample sites. The method is applicable to wide range applications starting from semiconductor chip evaluation to polymer processing.

EXAMPLES

Example 1

This example illustrates, with specific parameters, the alternate line imaging embodiment of the present invention. The technology used for imaging is the following. The sample was prepared using dye Rh 640. In the system, used here to demonstrate, among other things, other imaging capabilities of the above idea, two lasers, one a He—Ne laser operating at 633 nm and an Ar-ion laser operating at 488 nm were simultaneously delivered into a confocal microscope using a combination of dichroic mirrors and a single mode optical fiber: from argon laser (488 nm, for Stokes excitation) and He—Ne laser (633 nm, anti-Stokes excitation). Acousto-optic modulators were placed in the beam path of each laser and synchronized with the line sync signal from the Bio-Rad confocal microscope control unit most available commercial laser scanning microscopes including confocal systems provide this synchronization signals. The synchronization signals are fed through a signal processing circuit to provide two complementary trigger signals, which turn on in an alternating fashion, the two modulators synchronized with each line scan of the confocal system. The diffracted beams from these modulators are combined, using a 50/50 beam splitter and the combined beam is coupled into a single mode fiber for beam delivery into the confocal microscope. This arrangement permits imaging by the switching of laser excitations for each line of the raster scan (odd scanning lines: 488 nm is OFF and 633 nm is ON; even scanning lines: 488 nm is ON and 633 nm is OFF) during one scan (line). This way, obtained images consist of two images: odd lines form Stokes luminescence image, while even lines form anti-Stokes image. The diameter of laser spot during scanning procedure is about 1 μm, and the distance between two scanning lines is ~0.5 μm. Therefore the scanning of two neighbor lines is approximately equivalent to scanning the same points of the sample. A schematic diagram of the optical setup used is shown in FIG. 5. During raster scanning of images, alternatively 488 nm line and 633 nm line are selected for each line scan. The resulting image, containing information about both excitations, is separated into two different images using software. In this case, a custom program written in Matlab 6.0 is used to analyze the data. A 512×512 pixel size (resolution) image was recorded, from which was obtained two 256×512 pixel size images, one for each laser excitation after separating the two channels. Averaging along one dimension can also be used to obtain a 256×256 pixel size image format from the 256×512 pixel size image. FIG. 6 shows an example of how the extracted images are used to give a thermal imaging of a cell. Extracted even line image (anti-Stokes emission) and odd line image (Stokes emission) are shown. Using calibration plot shown in FIG. 4 and using the ratio of these two images, we can obtain the thermal image as shown in FIG. 6. This extraction algorithm can be implemented easily in any programming language. The resolution can be further improved if the initial images are obtained at 1024×1024 pixels format. But even 256×256 image size (resolution) was good enough to show details inside the cells.

This scanning can be implemented in a different way by switching the lasers for individual frames, however, switching between lines reduces the delay between obtaining the Stokes and anti-Stokes images. The sample is scanned. First, the Stokes and the anti-Stokes intensity images are extracted from original image. Second, intensities of the anti-Stokes image are normalized to intensities of the Stokes image. Obtained thermal images were filtered to avoid large fluctuations and noise.

Example 2

This example demonstrates the heating and thermal imaging of a fluorophore-containing polymer film. A polymer film (Poly methyl methacrylate) doped with Rhodamine 640 was prepared by dissolving polymethyl methacrylate and dye in acetone and spin casting to form the polymer film. A metal wire was inserted to locally change the temperature inside the sample. Acquisition and processing was done as described above in Example 1. The temperature of the sample was changed using a low electric current through the metallic wire and was monitored using the imaging technique of Example 1. FIG. 7 shows a series of thermal images which are the temperature maps obtained after calculating the anti-Stokes-Stokes ratio. The plot shown at the bottom shows the temperature distribution-across the sample, perpendicular to the heating element.

Example 3

This example demonstrates the in vitro application of the inventive imaging system. 3T6 cells were cultured and stained with dye Rhodamine 640 for 20 minutes. 3T6 cells (a human carcinoma cell line) was stained with the dye Rh640. In this experiment, 50 μl of a 10 μM Rh640 solution in a dimethylsulfoxide/water mixture was added directly to the 35 mm cell culture Petri dish, and incubated for 30 min. After incubation, cells were washed with the culture media to remove all the free dye, and then imaged under the confocal microscope using a 60× water immersion objective. Cells uptake this dye easily and it was incorporated into the cells. Cells were imaged at room temperature. The culture dish was washed several times to remove excess dye from the media. Thermal images were acquired using the technique described in detail in Example 1 (FIG. 6). Cell areas of high intensity are at higher temperatures than areas of low intensity. This image was acquired at room temperature, showing an approximately uniform temperature distribution in the imaging plane of the cell (~25° C.).

Example 4

Figure 8:
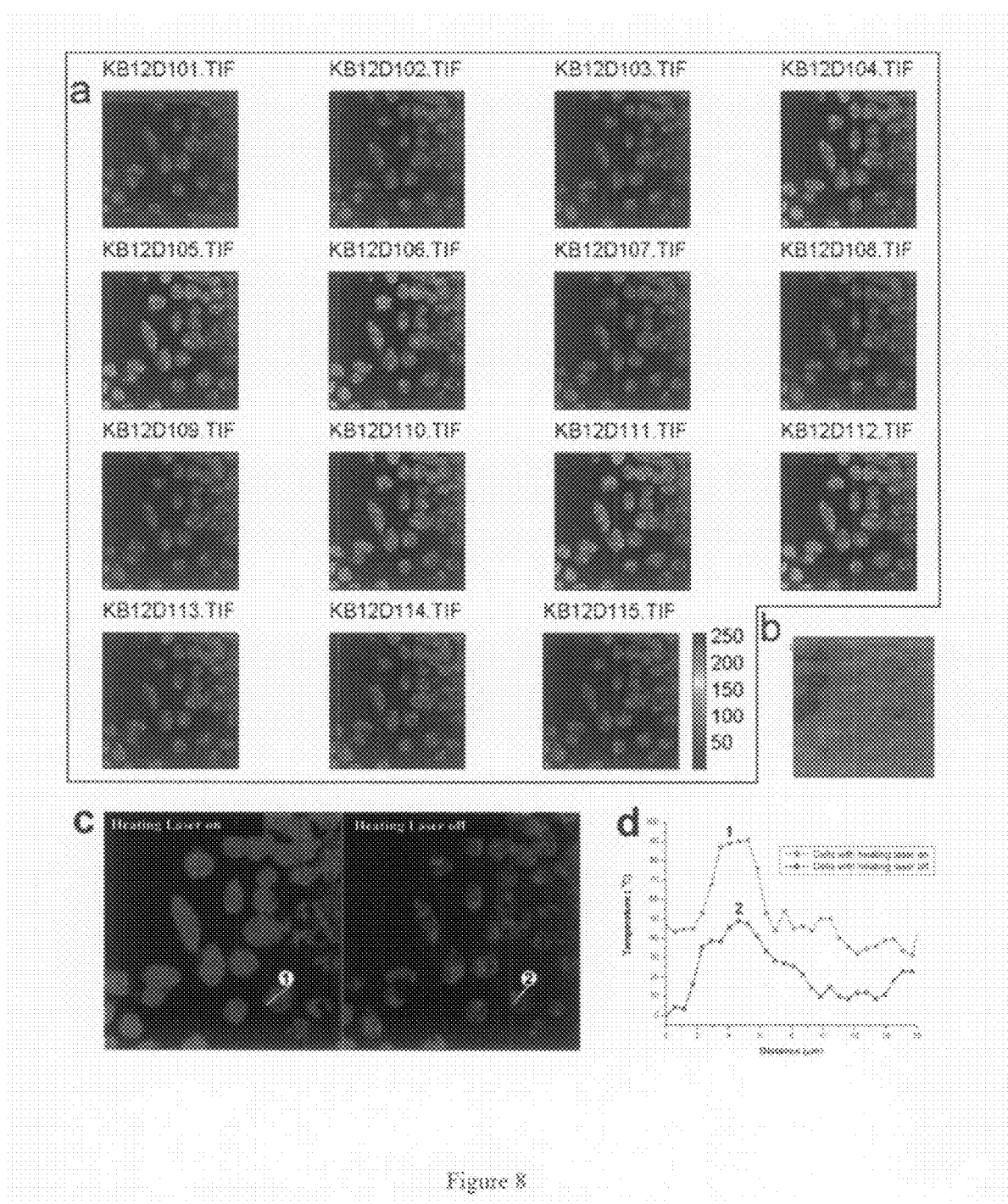

KB cells, another human carcinoma cell line, were stained with the dye Rh640. In this experiment, 50 μl of a 10 μM Rh640 solution in a dimethylsulfoxide/water mixture was added directly to the 35 mm cell culture Petri dish, and incubated for 30 min. After incubation, cells were washed with the culture media to remove all free dye, and then imaged under the confocal microscope using a 60× water immersion objective. Cells uptake this dye easily and it was incorporated into the cells. Cells were imaged at room temperature. Part of the cell culture dish was illuminated with a 1.9 μm laser. The laser radiation is absorbed by water and locally increases the temperature of the sample. A series of thermal images were acquired while turning the heating laser on and off (FIG. 8). The heating an cooling of the cells is indicated by the change in intensity of the image.

Example 5

The following example demonstrates the use of the inventive imaging method to image temperature gradients inside living cells, as well as the feasibility of measuring changes in the temperature gradient across cells over time. KB cells (Green Monkey Kidney cells) were stained with dye Rhodamine 640. Simultaneously, two laser beams, 488 nm line from an Ar-ion laser and 633 nm line from a He—Ne laser were combined using a 50/50 beam splitter and were coupled into a confocal microscope through a single mode fiber: To select the laser lines for each line scan, two acousto-optic modulators were used in each laser beam path and the diffracted beams were used for coupling into the fiber.

The switching of laser beams in synchronization with the beam raster scan was achieved through a custom signal processing circuit and sync signals available with the commercial microscope (in this case, Bio-Rad MRC 1024). This arrangement permitted the switching of excitation lasers for each line scan during the acquisition of one image (odd scanning lines: 488 nm is OFF and 633 nm is ON; even scanning lines: 488 nm is ON and 633 nm is OFF). The picture resolution was 512×512 pixels. Here the obtained images consisted of two images: odd lines formed Stokes luminescence image, while even lines formed ASE image. The diameter of the laser spot during scanning procedure was from approximately 0.5 micrometer to approximately 1 micrometer depending on the selected objective, while the distance between the scanning lines was in the range of 0.2-0.5 micrometers. Hence, the images obtained are from approximately the same area in the sample within the available optical resolution.

Images were obtained as described in Example 1. Thermal images were filtered to avoid large fluctuations and noise. FIG. 9 shows a time series of thermal images from the cells, obtained at an interval of 1.3 seconds, showing a uniform temperature distribution inside cells. These images are obtained at different time intervals. In the present example, there was no change in the temperature of the cells during the imaging sequence, and the images have excellent resolution and reproducibility between measurements. In situations in which agents such as drug treatment, treatment with lasers, or other stresses are applied, the temperature changes can be expected to be visibly detectable.

While this invention has been illustrated via the embodiments described herein, routine modifications will be apparent to those skilled in the art, which modifications are intended to be within the scope of the invention.

We claim:

1. A method for determining the temperature at a location in a sample, said method comprising the steps of:
    a) providing a sample having a concentration of a fluorophore at said location in said sample, wherein 1) said fluorophore has an absorption such that, when stimulated by radiation at a first wavelength, said fluorophore emits Stokes emission having a spectrum, and 2) when stimulated by radiation at a second wavelength, said second wavelength on the long wavelength edge of said spectrum, said fluorophore emits anti-Stokes emission;
    b) stimulating Stokes emission at said location with radiation of said first wavelength and measuring the intensity of said Stokes emission;
    c) stimulating anti-Stokes emission at said location with radiation of said second wavelength and measuring the intensity of said anti-Stokes emission; and
    d) using the intensities measured in steps b) and c) to derive the temperature at said location.

2. A method as in claim 1 wherein said fluorophore is a nanoparticle.

3. A method as in claim 1 wherein said first and second wavelengths are two frequencies of laser light which are alternated using an acousto-optic modulator or an optical shutter.

4. A method as in claim 3 wherein said two frequencies are two spectral lines from the same laser.

5. A method as in claim 1, wherein said method has a temperature resolution which is better than 0.5 K.

6. A method as in claim 1, wherein said sample comprises one or more cells which, optionally, comprise a tissue.

7. A method as in claim 1, wherein said sample comprises an integrated circuit which is, optionally, an optical integrated circuit; or a semiconductor chip.

8. A method for developing a spatial temperature map of an area or volume of a sample, said method comprising the steps of:
    a) providing a sample having a distribution of a fluorophore on or in said sample, wherein 1) said fluorophore has an absorption such that, when stimulated by radiation at a first wavelength, said fluorophore emits Stokes emission having a spectrum, and 2) when stimulated by radiation at a second wavelength, said second wavelength on the long wavelength edge of said spectrum, said fluorophore emits anti-Stokes emission;
    b) stimulating Stokes emission at one or more locations in said area or volume with radiation of said first wavelength and measuring the intensity of said Stokes emission;
    c) stimulating anti-Stokes emission at said one or more locations in said area or volume with radiation of said second wavelength and measuring the intensity of said anti-Stokes emission; and
    d) repeating steps b) and c) for second locations, different from said first locations, in said area or volume; and
    e) for each one of said locations, using the intensities measured in steps b) and c) at said location to derive the temperature at said location.

9. A method as in claim 8 wherein said first and second wavelengths are two frequencies of laser light which are alternated using an acousto-optic modulator.

10. A method as in claim 9 wherein steps b) through d) are performed in a raster scan.

11. A method as in claim 10 wherein said first and second wavelengths are two lines of laser light from the same laser.

12. A method as in claim 11 wherein the temperature map has a temperature resolution which is less than 0.5 K.

13. A method as in claim 10 wherein the first and second wavelengths are coupled into a laser scanning system which is, optionally, a confocal imaging system.

14. A method as in claim 13 wherein the sample comprises a polymer sheet through which dye is distributed and which is in contact with an object having a spatial temperature distribution.

15. A method as in claim 10 wherein the scanning is conducted by alternate line raster scanning.

16. A method as in claim 8 wherein the sample comprises one or more cells which, optionally, comprise a tissue.

17. A method as in claim 16 wherein said sample contains a distribution of dye molecules which are attached to or incorporated into nanoparticles.

18. A method as in claim 17 wherein said nanoparticles are inhomogeneously distributed throughout said sample.

19. A method as in claim 8 wherein the sample comprises an integrated circuit which is, optionally, an optical integrated circuit; or a semiconductor chip.

20. A method as in claim 19 wherein the sample comprises a dye which is distributed in a polymer sheet overlaying said integrated circuit or semiconductor chip.

* * * * *